United States Patent [19]

Dill

[11] Patent Number: 4,466,893

[45] Date of Patent: Aug. 21, 1984

[54] METHOD OF PREPARING AND USING AND COMPOSITION FOR ACIDIZING SUBTERRANEAN FORMATIONS

[75] Inventor: Walter R. Dill, Duncan, Okla.

[73] Assignee: Halliburton Company, Duncan, Okla.

[21] Appl. No.: 369,389

[22] Filed: Apr. 19, 1982

Related U.S. Application Data

[63] Continuation-in-part of Ser. No. 225,177, Jan. 15, 1981, abandoned.

[51] Int. Cl.³ .............................................. E21B 43/27
[52] U.S. Cl. ................................ 252/8.55 C; 166/307
[58] Field of Search .................... 252/8.55 C; 166/307

[56] References Cited

U.S. PATENT DOCUMENTS

| 2,596,137 | 5/1952 | Fast ...................................... 252/8.55 |
| 2,689,230 | 9/1954 | Cardwell et al. ................... 252/8.55 |
| 2,778,427 | 1/1957 | Cardwell et al. ............... 252/8.55 X |
| 2,824,833 | 2/1958 | Cardwell et al. ................... 252/8.55 |
| 3,233,672 | 2/1966 | Carpenter ............................ 166/307 |
| 3,634,237 | 1/1972 | Crenshaw et al. ............. 252/8.55 X |
| 3,824,834 | 2/1958 | Cardwell et al. ................... 252/8.55 |
| 3,826,312 | 7/1974 | Richardson et al. .......... 252/8.55 X |
| 3,920,566 | 11/1975 | Richardson et al. ............... 252/8.55 |
| 4,061,580 | 12/1977 | Jahnke ................................. 252/8.55 |

FOREIGN PATENT DOCUMENTS

| 1052557 | 4/1979 | Canada ............................... 252/8.55 |
| 2901222 | 7/1979 | Fed. Rep. of Germany ..... 252/8.55 |

*Primary Examiner*—Herbert B. Guynn
*Attorney, Agent, or Firm*—Robert A. Kent; Thomas R. Weaver

[57] ABSTRACT

A composition and method of acidizing or fracturing a subterranean formation comprising contacting the formation with a composition comprising an acid, urea, and a selected gelling agent. The urea is present in an amount sufficient to extend the viscous stability of the gelled acid composition in comparison to the acid and gelling agent alone.

19 Claims, No Drawings

METHOD OF PREPARING AND USING AND COMPOSITION FOR ACIDIZING SUBTERRANEAN FORMATIONS

This application is a continuation-in-part of copending U.S. Ser. No. 225,177 filed Jan. 15, 1981, now abandoned.

This invention relates to acid treating or acidizing of subterranean formations.

The flow of oil from a subterranean formation to a well bore hole depends, among other factors, upon the degree of permeability of the formation. Often, the permeability is not sufficiently great to permit a desired rate of fluids, e.g., crude oil, natural gas, etc., from the formation. In such a case, the formation can be treated to increase its permeability.

Acidizing fluids have been utilized heretofore for carrying out treatments in subterranean oil, gas, or water producing formations. Such acidizing fluids primarily have been utilized to increase the productivity of oil and gas from calcareous formations by effecting the removal of reactive materials from naturally occurring fractures and pore spaces in the formations whereby the sizes thereof are increased. Acidizing fluids also have been utilized to create new fractures in formations with the acid acting to etch the fractures so that they remain open and have a high flow capacity.

The rate at which acidizing fluids react with reactive materials in a formation is a function of various factors including acid concentration, temperature, velocity, the type of reactive material encountered, etc. Whatever the rate of reaction, the acidizing fluid can be introduced into the formation only a certain distance before it becomes spent. The time required for the acidizing fluid to become spent is referred to herein as "reaction time". In creating new fractures in a formation, if the acidizing fluid is pumped under pressure further into the formation after it has become spent, it may extend fractures in the formation, but it may not increase the flow capacities of the extended fractures. The fractures may close completely when the pressure is relieved. Thus, it is important to extend the reaction time of acidizing fluids so that either or both reactive materials are removed and new fractures are etched for as great a distance into the formation from the well bore as possible.

Another problem encountered in acidizing operations is the instability of the thickening or viscosifying agents which are incorporated into the acid used to carry out the acidizing operation. The instability of the thickening or gelling agents when they are mixed with the acid results in a loss of viscosity of the acidizing material within a short period of time which makes the acidizing material less effective when carrying out fracturing operations.

Still another problem that is frequently encountered in an acidizing operation is the release of corrosive fumes as the acid is injected down the well bore. These fumes can cause corrosion to the surface equipment used to carry out the operation and cause irritation and discomfort to the persons near the equipment.

The present invention provides a composition and method for acid treating a subterranean formation which helps overcome the above-mentioned problems.

In accordance with the invention, there is provided a composition comprising an aqueous solution of acid, urea, and a selected thickening or gelling agent. Suitable acids that may be employed to carry out the invention are hydrochloric acid, hydrofluoric acid, formic acid and acetic acid and mixtures thereof, although the preferred acid is hydrochloric acid. The acid used to carry out the invention may be present in the range of from about 1 to about 35 percent weight of acid in the acidic composition. If hydrochloric acid is the acid composition used to carry out the invention, a hydrochloric acid strength of greater than 35 percent by weight of acid has been found not to be particularly desirable as a precipitate will form when the hydrochloric acid-urea composition reacts with limestone.

The relative proportions of acid and urea can vary widely, but generally fall within an acid to urea molar weight ratio in the range of from about 5:1 to about 1:5. The most preferred molar weight ratio is 1:1. The urea is admixed with the acid in an amount sufficient to extend the viscous stability of the gelled acidizing composition in comparison to the viscous stability of a composition comprising the acid and selected gelling agent alone.

The gelling agent comprises at least one member selected from the group consisting of galactomannans such as guar gum, gum karaya, gum tragacanth, gum ghatti, gum acacia, gum konjak, shariz, locus, psyllium, tamarind, gum tara, carrageenin, gum kauri, modified guars such as hydroxypropyl guar, hydroxyethyl guar, carboxymethyl hydroxyethyl guar, carboxymethyl hydroxypropyl guar and alkoxylated amines such as:

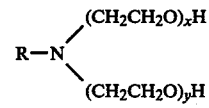

wherein R is selected from the saturated and unsaturated aliphatic groups having the range of from about 8 to 22 carbon atoms and mixtures thereof and the average sum of the value of x and y in the mixture is in the range of about 0 to about 10. The preferred thickening or gelling agent for carrying out the present invention is guar gum or a modified guar gum. The use of a gelling agent other than those previously identified produces a gelled acid which does not exhibit the significant increase in viscosity or extended viscous stability of the gelled acid composition of the present invention.

The amount of thickening or gelling agent used in the acidic composition of the invention can vary widely depending upon the viscosity, grade, and purity of the gelling agent and the properties desired in said composition. In general, the amount of thickening or gelling agent used will be in the range of from about 0.1 to about 1 percent by weight of the composition. There is, however, really no limit on the amount of gelling or thickening agent which can be used as long as the gelled acidic composition can be pumped in accordance with the methods of the invention.

Other materials may be included in the gelled acidic composition of the invention. For instance, proppants including graded sand, river sand, glass beads, sintered bauxite, ceramic beads and walnut shells in the range of from about 0.25 to 15 pounds per gallon of liquid may be used. In addition, various treating agents such as acid corrosion inhibitors, mutual solvents, anti-sludging agents and friction reducing agents may be added to the acid composition of the invention.

When it is more desirable to contact the subterranean formation with a foam containing the gelled acidic composition of the present invention, any foaming agent compatible with the composition of the invention and capable of producing foam in an acidic environment may be used. Many of these foaming agents are disclosed in U.S. Pat. No. 4,044,833.

The method of the invention is carried out by first preparing the acidic composition of the invention. The acid composition is prepared by adding the urea to the acid solution while agitating the acid solution. The gelling or thickening agent then is added to the acid-urea composition in amounts sufficient to achieve the viscosity desired. An unexpected benefit of the acid composition of the invention is a reduction in the quantity of gelling agent necessary to produce the desired viscosity in comparison to a similar acid in the absence of an effective amount of urea. The acid compositions of the invention can be prepared on the surface in any convenient mixing apparatus, e.g., a rotating, motor-driven, truck-mounted, cylindrical or oval-shaped mixer, which is adapted for convenient removal of the contents, such as by tipping, pumping, or application of gas pressure. The composition may be either transferred at a controlled rate directly down the well bore or it may be removed to a convenient storage tank for injection down the well bore.

The composition then is introduced into the subterranean formation. The acid is introduced into the subterranean formation whereby the calcareous rock in the formation is dissolved thereby increasing the permeability, and permitting better flow of fluids through the formation. The pumping rate and pressures utilized will obviously depend upon the characteristics of the formation and whether fracturing of the formation is desired. After the acid composition has been injected in this manner, the well will normally be shut in and allowed to stand for a period of time ranging from about one hour to several hours or, possibly, a day or more. If there is pressure on the well, the pressure then is released and the spent acid composition, containing salts formed by the reaction of the acid composition, is permitted to flow back into the well bore and is pumped or flowed to the surface. The well may thereafter be placed on production or used for other purposes.

An alternate technique which may be employed for carrying out the method of the present invention, is to create fractures in the formation in a conventional manner and place a conventional propping agent in the fractures formed. Conventional propping agents may be sand, glass beads, plastic particles, and others well known in the art. After the fractures have been formed, extended, and a propping agent placed therein, the pressure on the formation is reduced allowing the fractures to close on the propping agent. Acid then is pumped into the formation at a rate and pressure below the pressure required to open the fractures, but sufficient to cause the gelled acid composition to flow through the propped fracture. The acid will etch high capacity flow channels along portions of the fracture without appreciably disturbing the propping agent. High rates of the acid composition then may be pumped into the fracture within the formation to extend the flow channels relatively long distances outwardly from the well bore.

The following examples will serve to more comprehensively illustrate the principals of the invention, but in being directed to certain specific compounds and process steps and conditions, are not intended to limit the bounds of the invention.

EXAMPLE I

The stability of the urea hydrochloride composition is examined by placing aliquots of solutions, equivalent to 15 percent hydrochloric acid and 23.6 percent hydrochloric acid, in bottles at 76° F. and 200° F. The 23.6 percent composition is prepared by mixing 100 ml. of 35 percent hydrochloric acid with approximately 67.5 grams of urea. The 15 percent composition is prepared by mixing 100 ml. of 22 percent hydrochloric acid with approximately 40 grams of urea. The aliquots are titrated with 0.2 n.NaOH using phenolphthalein as the indicator to determine the strength of the acid at various times. The results of these tests are shown on Table I below:

TABLE I

| | Stability of the Acid Compositions | | | | |
|---|---|---|---|---|---|
| Test | Strength Percent | Time Hours | Temperature °F. | Final Acid Strength % | Acid Loss % |
| 1 | 15.0 | 0 Hours | 76 | 15.0 | 0.0 |
| 2 | 15.0 | 4320 Hours | 76 | 14.8 | 1.3 |
| 3 | 15.0 | 3 Hours | 200 | 14.6 | 2.7 |
| 4 | 15.0 | 18 Hours | 200 | 13.3 | 11.4 |
| 5 | 15.0 | 42 Hours | 200 | 9.0 | 40.0 |
| 6 | 15.0 | 60 Hours | 200 | 0.4 | 97.4 |
| 7 | 23.6 | 0 Hours | 76 | 23.6 | 0.0 |
| 8 | 23.6 | 4320 Hours | 76 | 23.4 | 1.0 |
| 9 | 23.6 | 3 Hours | 200 | 23.1 | 2.0 |
| 10 | 23.6 | 18 Hours | 200 | 19.4 | 17.5 |
| 11 | 23.6 | 42 Hours | 200 | 14.2 | 40.0 |
| 12 | 23.6 | 60 Hours | 200 | 8.5 | 64.0 |

Based on the data in the above table, it is concluded that the urea hydrochloride composition remains stable for a substantial period of time, especially at temperatures in the range of about 76° F.

EXAMPLE II

An examination of limestone dissolving efficiency is made by spending the urea hydrochloride composition on Iceland Spar in a high pressure cell, with windows, at 500 p.s.i. at various temperatures. The 23.6 percent acid strength and the 15 percent acid strength are prepared in the same manner as Example I. The Iceland Spar is weighed before and after the tests to determine the amount of Iceland Spar dissolved. The percent acid efficiency is calculated on the basis of actual Iceland Spar dissolved compared to the theoretical amount of Iceland Spar that should be dissolved. The Iceland Spar is kept in contact with the urea hydrochloride compositions for a period of three hours. The results of these tests are set forth in Table II below:

TABLE II

| | Limestone Dissolving Efficiency of Urea Hydrochloride Composition | | |
|---|---|---|---|
| Test | Acid Strength % | Temperature °F. | Acid Efficiency % |
| 1 | 15.0 | 76 | 100 |
| 2 | 15.0 | 200 | 93 |
| 3 | 15.0 | 250 | 88 |
| 4 | 23.6 | 76 | 97 |
| 5 | 23.6 | 200 | 93 |
| 6 | 23.6 | 250 | 71 |

The results of the tests show that the urea hydrochloride composition has an excellent limestone dissolving efficiency.

EXAMPLE III

Experiments are conducted comparing the stability of the gelled urea hydrochloride of the invention with gelled hydrochloric acid. These gelled compositions are prepared by adding the gelling agent to the acid composition and mixing this material until a dispersion is achieved. An approximately 23.6 percent acid solution is used in all test runs of the example and is prepared in the same manner as Examples I and II. The viscosities are determined with a Brookfield Viscosimeter at 76° F. using spindles 1 and 4 at 60 RPM. The results of these tests appear in Table III below:

TABLE III

Gel Stability of Urea Hydrochloride Compositions

| Test Number | Pounds of Gelling Agent/ 1,000 gal. of Acidizing Composition | Gelling Agent Used | Acidizing Composition | Viscosity (cp) (Time in Minutes) | | | | | | | |
|---|---|---|---|---|---|---|---|---|---|---|---|
| | | | | 2 | 5 | 10 | 20 | 30 | 60 | 120 | 960 |
| 1 | 80 | Hydroxypropyl Guar | Urea-HCl | — | 1400 | 1400 | 1300 | 900 | 400 | 74 | 25 |
| 2 | 80 | Hydroxypropyl Guar | HCl | — | 17 | 14 | 9 | — | — | — | — |
| 3 | 80 | Carboxymethyl Hydroxyethyl Guar | Urea-HCl | — | 1450 | 1750 | 2100 | 2100 | 1200 | 400 | 36 |
| 4 | 80 | Carboxymethyl Hydroxyethyl Guar | HCl | — | 74 | 34 | 17 | 14 | 9 | 7 | — |
| 5 | 80 | Ethylene Oxide Polymer | Urea-HCl | — | 350 | 350 | 350 | 350 | 400 | 400 | 240 |
| 6 | 80 | Ethylene Oxide Polymer | HCl | — | 165 | 165 | 165 | 175 | 160 | 140 | 100 |
| 7 | 80 | Guar Gum | HCl | — | 450 | 150 | — | — | — | — | — |
| 8 | 80 | Guar Gum | Urea-HCl | — | — | 2100 | 2250 | 2050 | 1250 | 475 | 100 |

The results of these experiments show dramatically the greater gel stability of the urea hydrochloride versus the gelled hydrochloride acid.

EXAMPLE IV

Experiments are conducted comparing the extended viscous stability of the gelled urea hydrochloride of the invention with gelled hydrochloric acid and with hydrochloric acid-urea compositions utilizing cellulosic gelling agents. These gelled compositions are prepared by adding the gelling agent to the acid composition and mixing this material until a dispersion is achieved. An approximately 23.6 percent acid is used in all test runs of the example and is prepared in the same manner as Example I. The gelling agent is admixed in the ratio designated in each test. The viscosities are determined with a Brookfield Viscosimeter at 76° F. using spindles 1 and 4 in tests 1 through 4 and spindle 4 in tests 5 through 8 at 60 RPM. The results of these tests are set forth in Table IV below:

ling agents of the present invention versus other gelling agents.

EXAMPLE V

In order to compare the reaction rates of an acid composition using urea and formic acid with a composition using only formic acid, 100 milliliters of a solution that contained 10.25 grams of formic acid and 13.36 grams of urea was prepared. A second sample containing 10.25 grams of formic acid was also prepared. A chip of limestone was placed in each sample. The reactions of each sample were visually observed and it was observed that the sample containing the urea reacted slower on the limestone that the sample without the urea. In addition, the solution containing the formic acid-urea composition appeared to release less corrosive fumes to the atmosphere than the sample containing only formic acid.

EXAMPLE VI

In order to compare the reaction rates of an acid composition using urea and acetic acid with a composition containing only acetic acid, 100 milliliters of a solution that contained 10.13 grams of acetic acid and 10.13 grams of urea was prepared. A second sample containing 10 percent acetic acid was also prepared. A chip of limestone was placed in each sample. The reactions were visually observed and found that the sample containing the urea reacted slower on the limestone than the sample without the urea. In addition, the solution containing the acetic acid-urea composition appeared to release less corrosive fumes to the atmosphere than the sample containing only acetic acid.

TABLE IV

Viscous Stability of Acidic Compositions

| Test Number | Pounds of Gelling Agent 1,000 gal. of Acidizing Composition | Gelling Agent Used | Acidizing Composition | Viscosity (cp) (Time in Minutes) | | | | | |
|---|---|---|---|---|---|---|---|---|---|
| | | | | 5 | 10 | 20 | 30 | 60 | 120 |
| 1 | 80 | Hydroxypropyl Guar | Urea-HCl | 1400 | 1400 | 1300 | 900 | 400 | 74 |
| 2 | 80 | Hydroxypropyl Guar | HCl | 17 | 14 | 9 | — | — | — |
| 3 | 80 | Hydroxypropyltrimethylammonium chloride salt of cellulose | Urea-HCl | 41 | 46 | 50 | 52 | 57 | 56 |
| 4 | 80 | Hydroxypropyltrimethylammonium chloride salt of cellulose | HCl | 90 | 40 | 20 | 14 | 8 | 5 |
| 5 | 150 | Guar Gum | Urea-HCl | 6700 | 7450 | 6900 | 5600 | 3250 | 1500 |
| 6 | 150 | Guar Gum | HCl | 1000 | 700 | — | — | — | — |
| 7 | 150 | Hydroxyethylcellulose | Urea-HCl | 5375 | 5975 | 7700 | 7800 | 7000 | — |
| 8 | 150 | Hydroxyethylcellulose | HCl | 5050 | 4375 | — | 1550 | 850 | — |

The results of these tests show dramatically the increased viscosity and extended viscous stability of the urea hydrochloride compositions with the selected gel-

EXAMPLE VII

In order to compare the reaction rates of an acid composition containing urea, hydrochloric acid, and hydrofluoric acid with a composition containing only hydrochloric acid and hydrofluoric acid, 100 milliliters of a solution that contained 44.2 milliliters of 31.45 percent hydrochloric acid, 4.8 grams of ammonium bifluoride and 29.88 grams of urea was prepared. A second sample solution that contained 44.2 milliliters of 31.45 percent hydrochloric acid and 4.8 grams of ammonium bifluoride was prepared. A chip of Iceland Spar was placed in each sample. The reactions of both samples were visually observed and it was noted that the sample containing urea reacted slower on the Iceland Spar than the sample without the urea. In addition, the sample containing the urea appeared to release less corrosive fumes to the atmosphere than the sample without the urea.

This invention is not limited to the above described specific embodiments thereof; it must be understood, therefore that the detail involved in the descriptions of the specific embodiments is presented for the purpose of illustration only, and that reasonable variations and modifications, which will be apparent to those skilled in the art, can be made in this invention without departing from the spirit and the scope thereof.

What is claimed is:

1. A gelled acidizing composition comprising:
   a. an acid selected from the group consisting of hydrochloric acid, hydrofluoric acid, acetic acid and formic acid and mixtures thereof;
   b. a gelling agent selected from the group consisting of gum karaya, gum tragacanth, gum ghatti, gum acacia, gum konjak, shariz, locus, psyllium, tamarind, gum tara, carrageenin, gum kauri, hydroxypropyl guar, hydroxyethyl guar, carboxymethyl hydroxypropyl guar and carboxymethyl hydroxyethyl guar, said gelling agent present in an amount sufficient to gel said acid; and
   c. urea in an amount sufficient to extend the viscous stability of said composition in comparison to the viscous stability of a gelled acid comprising said selected acid and said selected gelling agent alone.

2. The composition recited in claim 1 wherein said gelling agent is guar gum.

3. The composition recited in claim 2 wherein said acid is hydrochloric acid.

4. The acidizing composition as recited in claim 3 wherein said urea and said hydrochloric acid are present in said composition in an amount sufficient to produce a molar ratio of said urea to said hydrochloric acid in the range of from about 1 to about 1.

5. The acidizing composition as recited in claim 4 wherein said hydrochloric acid is present in the range of from about 10 percent to about 34 percent by weight of said composition.

6. The acidizing composition recited in claim 5 further comprising a propping agent.

7. A method of preparing a gelled acid composition comprising:
   a. adding urea to an acid selected from the group consisting of hydrochloric, hydrofluoric, acetic, and formic to form a mixture in an amount sufficient to extend the viscous stability of said gelled acid composition in comparison to the viscous stability of a gelled acid comprising said acid and a selected gelling agent; and
   b. adding a gelling agent in said mixture in an amount sufficient to form said gelled acid composition, said gelling agent being selected from the group consisting of gum karaya, gum tragacanth, gum ghatti, gum acacia, gum konjak, shariz, locus, psyllium, tamarind, gum tara, carrageenin, gum kauri, hydroxypropyl guar, hydroxyethyl guar, carboxymethyl hydroxypropyl guar and carboxymethyl hydroxyethyl guar.

8. The method recited in claim 7 wherein said gelling agent is guar gum.

9. The method recited in claim 8 wherein said acid is hydrochloric acid.

10. The acidizing method as recited in claim 9 wherein said urea and said hydrochloric acid are present in said composition in an amount sufficient to produce a molar ratio of said urea to said hydrochloric acid in the range of from about 1 to about 1.

11. The acidizing method as recited in claim 10 wherein said hydrochloric acid is present in the range of from about 10 percent to about 34 percent by weight of said composition.

12. The method recited in claim 7 further comprising the step of adding a propping agent to said gelled acid composition.

13. A method of acid treating a subterranean formation comprising:
   a. contacting said formation with a gelled acid composition comprising:
      (i) an acid selected from the group consisting of hydrochloric acid, hydrofluoric acid, acetic acid, and formic acid and mixtures thereof;
      (ii) a gelling agent selected from the group consisting of gum karaya, gum tragacanth, gum ghatti, gum acacia, gum konjak, shariz, locus, psyllium, tamarind, gum tara, carrageenin, gum kauri, hydroxypropyl guar, hydroxyethyl guar, carboxymethyl hydroxypropyl guar and carboxymethyl hydroxyethyl guar, said gelling agent present in an amount sufficient to gel said acid; and
      (iii) urea in an amount sufficient to extend the viscous stability of said composition in comparison to the viscous stability of a gelled acid comprising said selected acid and said selected gelling agent alone; and
   b. withdrawing said composition from said formation.

14. The method recited in claim 13 wherein said gelling agent is guar gum.

15. The method recited in claim 14 wherein said acid is hydrochloric acid.

16. The acidizing method as recited in claim 15 wherein said urea and said hydrochloric acid are present in said composition in an amount sufficient to produce a molar ratio of said urea to said hydrochloric acid in the range of from about 1 to about 1.

17. The acidizing method as recited in claim 16 wherein said hydrochloric acid is present in the range of from about 10 percent to about 34 percent by weight of said composition.

18. The method recited in claim 13 wherein said acid composition contacts said formation at a pressure sufficient to fracture said formation.

19. The method recited in claim 18 further comprising the step of incorporating a propping agent in said acid composition.

* * * * *